Jan. 9, 1940.  E. R. BARRETT  2,186,796
TILTABLE TRUCK BODY
Filed Oct. 1, 1938   3 Sheets-Sheet 1
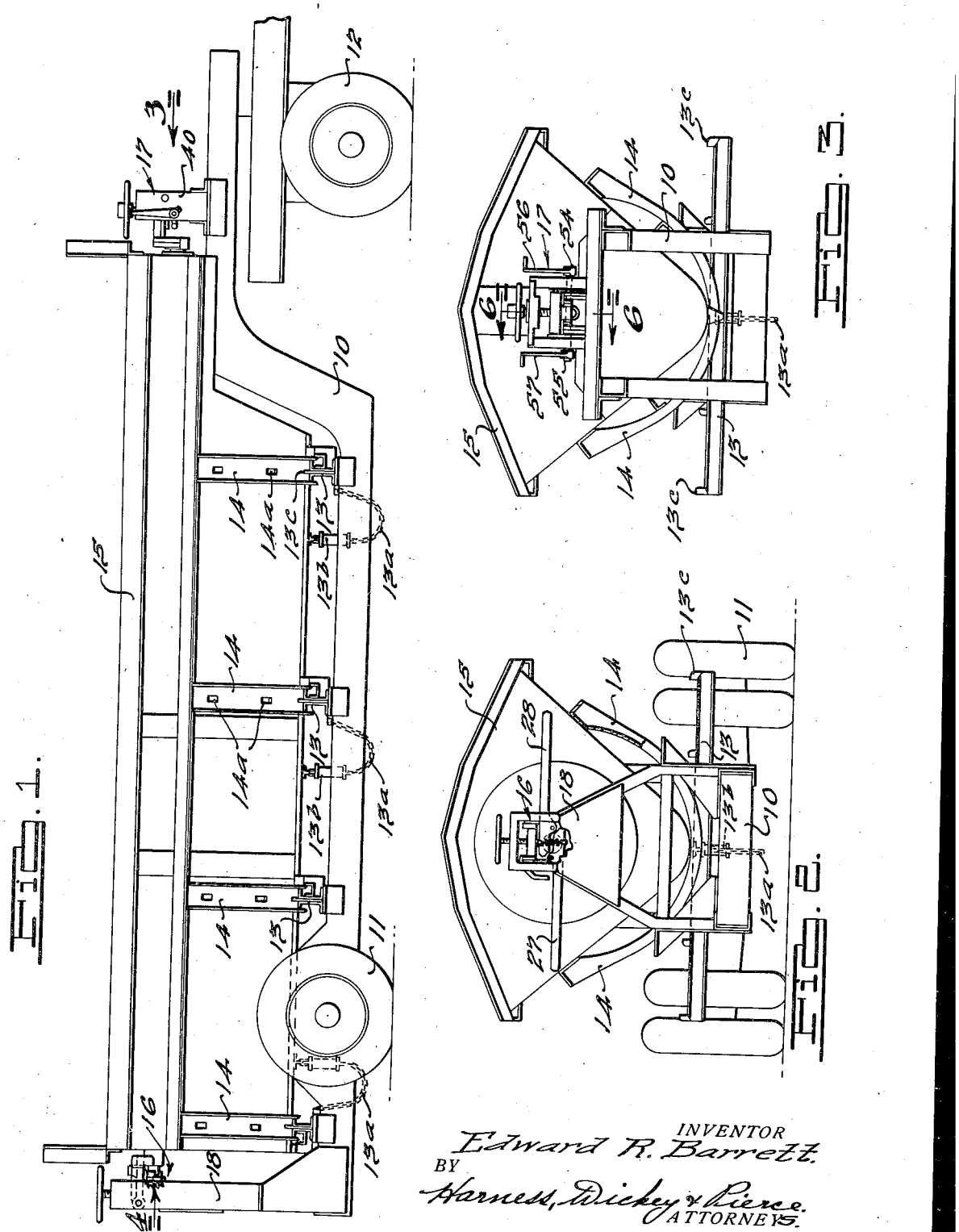
INVENTOR
Edward R. Barrett
BY
Harness, Dickey & Pierce
ATTORNEYS Jan. 9, 1940.  E. R. BARRETT  2,186,796
TILTABLE TRUCK BODY
Filed Oct. 1, 1938  3 Sheets-Sheet 2
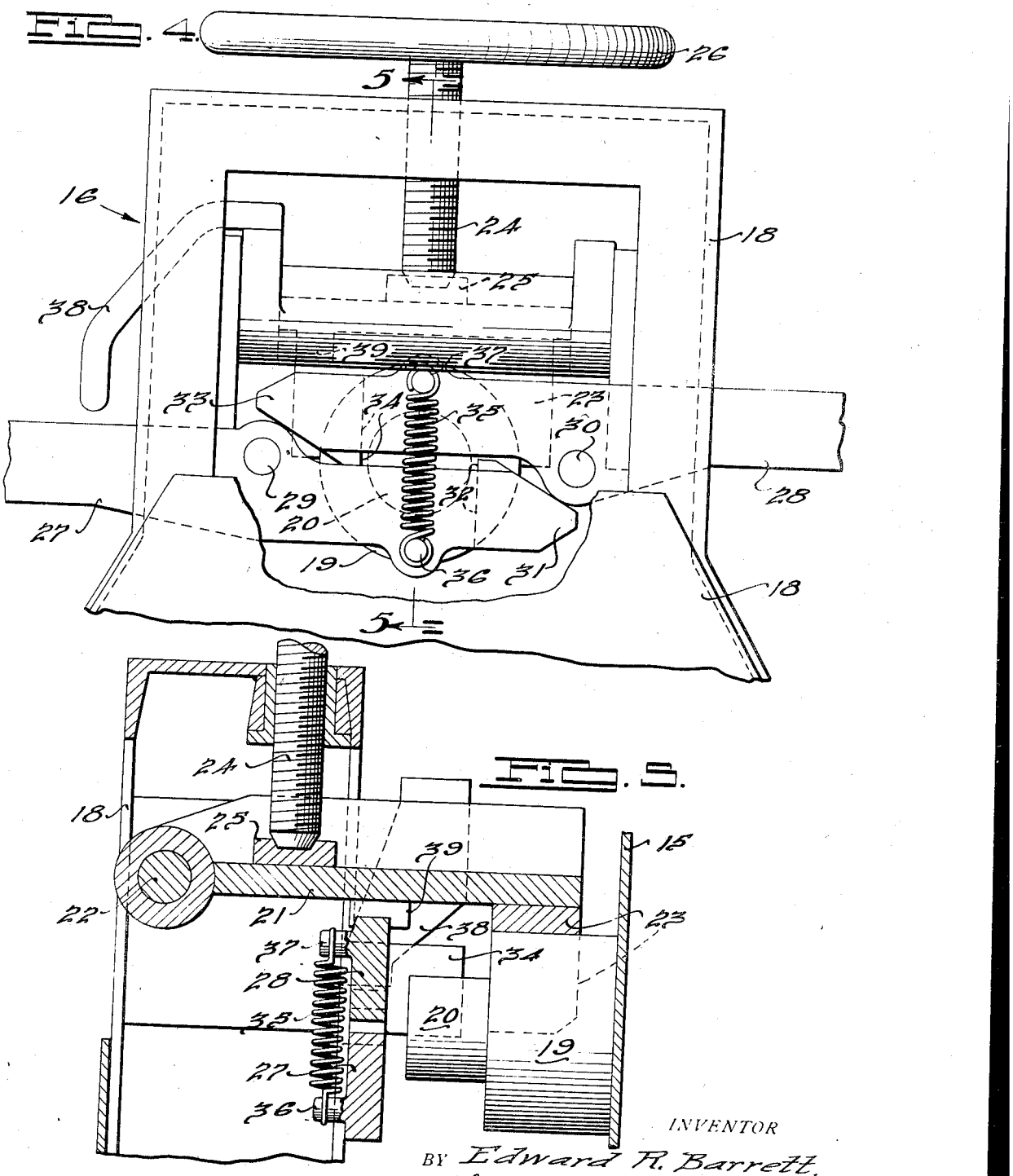
INVENTOR
BY Edward R. Barrett.
Harness, Dickey & Pierce.
ATTORNEYS.

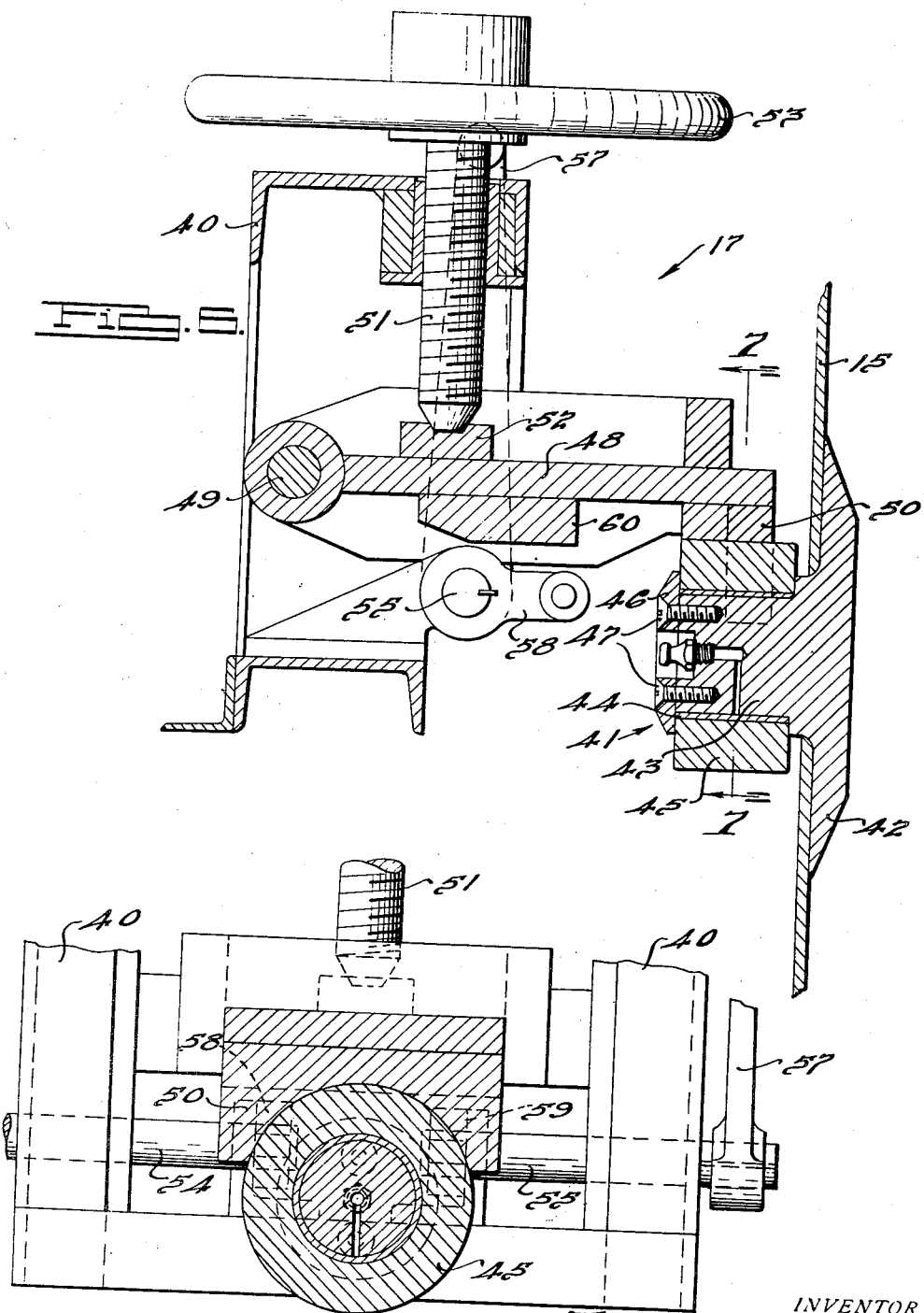

Patented Jan. 9, 1940

2,186,796

UNITED STATES PATENT OFFICE 2,186,796

TILTABLE TRUCK BODY

Edward R. Barrett, Detroit, Mich., assignor to Gar Wood Industries, Inc., Detroit, Mich., a corporation of Michigan Application October 1, 1938, Serial No. 232,703

14 Claims. (Cl. 298—38)

This invention relates to vehicles having bodies rockably mounted to dump from the side thereof.

The main objects of this invention are to provide improved means for securing a rockably mounted dump body tightly to its supporting frame so that it will not vibrate and rattle; to provide improved quickly releasing locking means for preventing rocking movement of the dump body; to provide quickly releasable locking means which may be actuated from either side of the truck body and which insures that the truck body cannot rock and dump toward the lever being actuated for unlocking the body; to provide two independent releasable locking means for locking the body against rocking action on its supporting frame work; and to provide a simple rugged structure which is fool-proof in operation and which will give satisfactory operation over a long period of use.

An illustrative embodiment of this invention is shown in the accompanying drawings, in which:

Fig. 1 is a view in side elevation of a side dump rocking body vehicle provided with the improved releasable locking means;

Fig. 2 is a view in end elevation of the same as viewed looking from the rear or left end of Fig. 1;

Fig. 3 is a view in front end elevation as viewed looking in the direction of the arrow 3 of Fig. 1;

Fig. 4 is an enlarged view in elevation of the locking mechanism illustrated at the rear end of the vehicle shown in Fig. 1, and as viewed looking in the direction indicated by the arrow 4 thereon;

Fig. 5 is a fragmentary sectional view taken along the line 5—5 of Fig. 4, looking in the direction indicated by the arrows;

Fig. 6 is an enlarged fragmentary sectional view taken along the line 6—6 of Fig. 3, looking in the direction indicated by the arrows;

Fig. 7 is a fragmentary sectional view taken on the line 7—7 of Fig. 6, looking in the direction indicated by the arrows.

Vehicles having side dump rocking bodies of the character herein shown and described are generally used for the hauling of refuse, garbage and the like. Several such vehicles are often coupled together in a train and one tractor is used to haul a train of them to the garbage disposal grounds.

At the present time it sometimes happens that when the locking mechanism which holds the body in an upright position is released by the attendants, the body, due to an uneven load thereon, will immediately rock over on its side without any manual urging. Also, it sometimes happens that under such conditions the body will rock toward the person who released the lock and thereby dump the load onto such person.

Furthermore, in vehicles of this character, the bodies jolt and jump around on their trackways with a great amount of clattering noise when traveling over rough ground. In the present invention means are provided for insuring that the load will not be dumped toward or onto the operator who releases the lock of the body and during conveyance of the load to the dumping grounds and the like the bodies are firmly clamped to their supporting trackways so as to eliminate the usual clattering noise which usually accompanies trains of this type of vehicle. The safety feature involved in the present invention is of great importance and the mechanical arrangement is such that it is impossible for the person unlocking the body to accidentally have the body rock over upon him.

In the construction shown in the drawings, the vehicle comprises a supporting frame work 10 mounted on ground wheels 11 and 12, and which is provided with a plurality of substantially horizontally disposed transversely extending trackways 13 which are spaced longitudinally of the framework 10. The trackways 13 fit between the side walls of inverted U-shaped members 14 which are of arcuate shape when viewed in side elevation, as shown most clearly in Figs. 2 and 3 of the drawings. The trackways 13 are provided with widely spaced teeth 13c which are received in registering openings 14A in the usual manner and which prevent slippage of the tracks 13 and members 14 relative to each other.

The members 14 are secured to and support a generally elongated dump body 15 of U-shape cross-section so that the body 15 is rockable to a position for dumping its load out of the side of the body. The rocking of the body on the trackways is limited by chains 13a of which each has one end anchored to its adjacent trackway, and its other end anchored to the body 15. Spring units 15b are interposed in the chains for cushioning the shock when the body rocks to its limit.

Means are provided for releasably locking the body 15 against rocking movement and in its upright central position, as shown in Figs. 1, 2 and 3 of the drawings, and comprise locking assemblies generally designated 16 and 17 in Figs. 1, 2 and 3 of the drawings. The assembly 16 is mounted on an upright frame standard 18 which constitutes part of the supporting frame work 10 and as shown most clearly in Figs. 4 and 5 of the drawings, comprises cooperating parts on the frame work and the end of the body 15.

The rear end of the body 15 is provided with a fixed stop 19 in the form of an annular boss, and which has an axially extending concentrically positioned annular boss 20 of smaller diameter extending from the face thereof and preferably formed integrally therewith. The frame standard 18 has one end of a horizontally disposed arm 21 pivoted thereto by a pin 22, the free end of the arm being provided on its underside with a semi-circular shaped saddle member 23 which embraces the larger portion of the fixed stop 19 when in normal position. A vertically disposed screw 24 is threaded through the frame 18 in position so that its lower end abuts against a pillow block 25 fixed as by welding to the upper side of the arm 21, for tightly forcing the saddle 23 carried by the arm 21 onto the fixed stop 19 and thereby tightly securing the body 15 on the trackways 13. The upper end of the screw 24 is provided with a hand wheel 26 by which the screw 24 may be manually operated.

A pair of horizontally disposed, oppositely extending, levers 26 and 27 are pivoted to the standard 18 by pins 29 and 30, respectively. The lever 27 extends beyond its point of pivotal connection, as shown at 31, and such extended end is provided with a lug 32, extending laterally from one side thereof, in position to engage that side of the fixed stop 20 which is opposite to the lever 27. The lever 28 also extends beyond its point of pivotal connection, as shown at 33, and is likewise provided with a laterally extending lug 34, positioned so as to engage that side of the fixed stop 20, opposite to the lever 28. The levers 27 and 28 are positioned one above the other in the same vertical plane and the extended ends 31 and 33 thereof, respectively, are normally yieldingly urged into contact with the respectively opposite lever by a tension spring 35. The opposite ends of the spring 35 are anchored to stud pins 36 and 37 which are integrally formed on the extended ends of the levers 27 and 28, respectively.

The pivoted arm 21 has welded thereto a laterally and downwardly extending finger 38, the lower end of which is positioned in slightly spaced relation directly above the lever 27 so as to be engaged thereby when the lever 27 is raised to clear the lug 32 from engagement with the fixed stop 20.

The under side of the pivoted arm 21 is also provided with a depending lug 39 which is positioned directly above the extended end 33 of the lever 28 and in slightly spaced relation thereto so as to be engaged by the extended end 33 when the lever 28 is pivoted downwardly to clear the lug 34 from engagement with the fixed stop 20.

The locking assembly generally designated 17 in Fig. 1 of the drawings is mounted on an upstanding frame standard 40 which constitutes part of the supporting frame-work of the vehicle. As shown most clearly in Figs. 6 and 7 of the drawings, the front end of the body 15 is also provided with a fixed stop generally designated 41. The fixed stop 41 comprises a relatively large flat disc-shaped head 42 which is adapted to be welded or otherwise rigidly secured to the inside surface of the body 15, and an annular trunnion member 43 integrally formed therewith which protrudes through an opening suitably formed in the body 15. The trunnion 43 is surrounded by a bushing 44 upon which is journaled a ring-like bearing member 45 which is retained on the trunnion by a ring-shaped cap 46 secured to the end of the trunnion by screws 47, the marginal edge of the ring 46 overlapping the face of the bearing member 45.

A horizontally disposed arm 48 is pivotally mounted at one end thereof on the frame 40 by a pivot pin 49 and the free swinging end thereof is turned downwardly and shaped to provide a semi-circular saddle 50 which is adapted to rest upon and partially surround the bearing ring 45. A vertically disposed screw shank 51 is threaded through the frame-work 40 in position so that its lower end rests upon and bears against a pillow block 52 which is welded or otherwise suitably secured to the top surface of the arm 48. The top end of the screw 51 extends above the framework 40 and is provided with a manually operable hand wheel 53 by the turning of which the arm 48 may be clamped securely and tightly against the fixed stop of the vehicle body.

Means are provided for raising the lever arm 48 about its pivot 49 so as to release the fixed stop on the saddle 50 and comprise a pair of axially aligned horizontally disposed shafts 54 and 55 which are journaled in suitable brackets mounted on the standards 40, and each of which has one end protruding beyond the outer sides of the standard. The outer protruding ends of the shafts 54 and 55 are provided with manually operable hand levers 56 and 57, respectively, keyed thereto and which are normally in an upright position with respect to their respective shafts.

The inner ends of the shafts 54 and 55 are provided with lever arms 58 and 59, respectively, which are keyed thereto, and the outer ends of which are provided with rollers for contacting a bearing block 60 which is welded or otherwise suitably secured to the under side of the arm 48.

The arrangement is such that 90° rotation of either of the shafts 54 or 55 will raise the arm 48, when screw 51 is backed away to give sufficient and proper clearance, so that the saddle 50 will disengage from the fixed stop of the body 15.

In the operation and use of this vehicle, during the time when the bodies are being loaded and hauled or transported to the dumping ground, the hand-wheels 26 and 53 are rotated so as to screw in their respective threaded shanks and tightly clamp their respective arms 21 and 48 tightly and securely onto their respective fixed stops and thereby clamp the body 15 securely to the trackways 13.

When it is desired to dump the bodies either to one side or the other, the hand wheels 26 and 53 are rotated so as to back their respective threaded shanks away from the pillow blocks 25 and 52 and have sufficient clearance for removing the saddles from their respective fixed stops.

The operator then rotates one of the hand levers 56 or 57, whichever lever is on his side of the vehicle, through a 90° movement. Such rotation of the hand lever causes the arm on the inner end of its shaft to raise the pivoted arm 48 by contact with the bearing block 60 until the saddle 50 is disengaged from the bearing ring 45. The operator then goes to the other end of the vehicle and either lifts up or pulls down on the horizontally extending lever 27 or 28, depending upon which side of the vehicle he is located. If it is the lever 28, pulling down of the lever will raise its inner end 33 so as to disengage the lug 34 from the fixed stop 20 and at the same time by abutting against the depending lug 39 will raise the pivoted arm 21 until its saddle 23 is lifted out of engagement with the fixed stop 19. With the lever in this position, it is then possible to rock the body on its trackway in a direction opposite to that upon which the operator is located. It will thus be seen that due to the lug 32 of the lever 27 the body is prevented from rocking or rolling toward the operator.

Should the operator be on the opposite side of the vehicle, it is then necessary for him to raise up on the lever 27, at which time the inner end 31 will be moved downwardly so as to cause the lug 32 to clear the fixed stop 20. At the same time, the upward movement of the lever 27 will cause it to abut against the depending lower end of the finger 38 which is rigidly attached to the pivoted lever 21 and in the same manner as hereinbefore described, will lift the lever 21 so that its saddle 23 is disengaged from the fixed stop 19. Thus, when the lever 27 is operated to release the body so that it may be dumped by rocking movement, the lug 34 on the inner extended end of the lever 28 will prevent the body from rocking toward the operator who is located adjacent to the lever 27. It will thus be seen that the operator cannot possibly unlock the body for dumping movement in such a manner as to permit the body to rock or dump upon or towards him.

Although but two specific embodiments of this invention have been herein shown and described, it will be understood that numerous details of the construction shown may be altered or omitted without departing from the spirit of this invention as defined by the following claims.

What is claimed is:

1. In a vehicle, a supporting frame, a dump body rockable on said frame, a fixed stop on said body, quickly releasable means mounted on said frame for engaging said stop to lock said body against rocking movement, and an adjustable pressure bearing clamp for tightly and rigidly securing said body to said frame.

2. In a vehicle, a supporting frame including substantially horizontal trackways, a dump body rockably mounted on said trackways, a fixed stop on said body, quickly releasable means mounted on said frame for engaging said stop to lock said body against rocking movement, and an adjustable pressure bearing clamp for tightly and rigidly securing said body against said trackways.

3. In a vehicle, a supporting frame, a dump body rockable on said frame, a fixed stop on said body, quickly releasable means mounted on said frame for engaging said stop to lock said body against rocking movement, and an adjustable pressure bearing clamp bearing on said stop for tightly and rigidly securing said body to said frame.

4. In a vehicle, a supporting frame, a dump body rockable on said frame, a fixed stop on said body, quickly releasable means mounted on said frame for engaging said stop to lock said body against rocking movement, and a screw clamp for tightly and rigidly securing said body to said frame.

5. In a vehicle, a supporting frame, a dump body rockable on said frame, a fixed stop on said body, quickly releasable means mounted on said frame for engaging said stop to lock said body against rocking movement, and a screw clamp bearing on said stop for tightly securing said body to said frame.

6. In a vehicle, a supporting frame including substantially horizontal trackways, a dump body rockably mounted on said trackways to dump from a side thereof, a fixed stop on an end of said body, quickly releasable means on said frame for engaging said stop to lock said body against rocking movement, and a screw clamp bearing on said stop for tightly securing said body on said trackways.

7. In a vehicle, a supporting frame, a dump body rockable on said frame, a fixed stop on said body, quickly releasable means mounted on said frame for engaging said stop to lock said body against rocking movement, said quickly releasable means comprising a pair of handles extending in opposite directions so as to be accessible at opposite sides, respectively, of said body, a lug on each of said handles positioned to normally engage opposite sides, respectively, of said stop, each of said lugs being located on the side of said stop opposite to its respective handle, yielding means for normally holding said lugs in stop-engaging position, and a screw clamp bearing on said stop for tightly securing said body to said frame.

8. In a vehicle, a supporting frame, a dump body rockable on said frame, a fixed stop on said body, quickly releasable means mounted on said frame for engaging said stop to lock said body against rocking movement, said quickly releasable means comprising a pair of substantially horizontally disposed handles pivoted on said frame, said handles extending in opposite directions so as to be accessible at opposite sides, respectively, of said body, each of said handles extending beyond its point of pivotal support, a lug on the extended end of each handle for engaging the side of said stop opposite to its respective handle, said handles being pivotally movable to move said lugs clear of said stop and thereby permit rocking movement of said body, yielding means for normally holding said handles so that their respective lugs lock said stop against movement, and a screw clamp bearing on said stop for tightly securing said body to said frame.

9. In a vehicle, a supporting frame, a body rockable on said frame to dump the same and two independent means for releasably locking said body against rocking movement, one of said means being a screw clamp for tightly and rigidly securing said body on said frame.

10. In a vehicle, a supporting frame, a body rockable on said frame to dump the same and two independent means for releasably locking said body against rocking movement, one of said means being quickly releasable and the other of said means being a screw clamp for tightly and rigidly securing said body on said frame.

11. In a vehicle, a supporting frame, a dump body rockable on said frame to dump the same, a fixed stop on said body, an arm pivoted on said frame, means on the free end of said arm for engaging said stop to thereby lock said body against rocking movement, and a manually operable hand screw for exerting pressure on said arm to tighten its connection with said stop.

12. In a vehicle, a supporting frame, a dump body rockable on said frame to dump the same, a fixed stop on said body, an arm pivoted on said frame, means on the free end of said arm for engaging said stop to thereby lock said body against rocking movement, quickly releasable means on said frame for engaging said stop to lock said body against rocking movement, and cooperating means on said arm and quickly releasable means for disengaging said arm from said stop when said quickly releasable means is actuated to release said stop.

13. In a vehicle, a body rockably mounted to dump the same, clamping means for tightly securing said body against rocking movement, quickly releasable means for locking said body against rocking movement, and means acting between both said clamping means and said quickly releasable means for disengaging said clamping means when loosened, when said quickly releasable means is actuated to unlock the body to permit rocking movement.

14. In a vehicle, a supporting frame, a body rockably mounted on said frame to dump the same, an arm pivoted on said frame, means on the free end of said arm to engage said body and releasably lock the same against rocking movement, a pair of manually operable levers pivoted on said frame and accessible from opposite sides, respectively, of said body for independently actuating said arm to release said body and thereby permit rocking movement thereof.

EDWARD R. BARRETT.